United States Patent [19]

Vatsvog

[11] 4,312,438
[45] Jan. 26, 1982

[54] BULLET ALIGNMENT APPARATUS

[76] Inventor: Marlo K. Vatsvog, 4221 S. 185th, Seattle, Wash. 98188

[21] Appl. No.: 127,187

[22] Filed: Mar. 4, 1980

Related U.S. Application Data

[63] Continuation of Ser. No. 890,136, Mar. 27, 1978, abandoned.

[51] Int. Cl.³ .............................................. B65G 47/24
[52] U.S. Cl. ..................................... 198/392; 221/160
[58] Field of Search .......................... 198/392, 397–400; 221/159, 160, 167, 169

[56] References Cited

U.S. PATENT DOCUMENTS

| | | | |
|---|---|---|---|
| 2,060,182 | 11/1936 | Dellaree | 221/160 |
| 2,433,096 | 12/1947 | Davis | 221/160 |
| 2,991,881 | 7/1961 | Craven | 198/398 |
| 3,254,753 | 6/1966 | Aidlin | 198/397 |
| 3,272,310 | 9/1966 | Blickisdorf et al. | 198/392 |
| 3,338,373 | 8/1967 | Aidlin et a. | 198/399 |
| 3,635,325 | 1/1972 | Sterling | 198/397 |

Primary Examiner—Joseph E. Valenza
Attorney, Agent, or Firm—Seed, Berry, Vernon & Baynham

[57] ABSTRACT

A ring having a plurality of successive receptacles revolves around a flat disc within a containment wall holding a plurality of randomly piled conical bullets. The disc and receptacles are inclined with the upper edge of the disc being positioned closely adjacent the downward end of the receptacles and slightly above the lower surfaces of the receptacles so that bullets carried by the receptacles past the edge of the disc will be held within the receptacles. The disc is recessed to have a lower surface well below the center line of the bullets within the receptacles and a beveled cam raises the bullet so that bullets having their conical noses facing the edge will slide from the receptacles back into the pile but bullets with their cylindrical ends facing the disc will engage the lower surface of the recess of the disc and continue to be held in the receptacles. At a further downstream position a second recess is provided with its lower surface below the lower surface of the receptacles so that all of the bullets will fall from the receptacles in a commonly axially aligned column. These bullets are collected in a removable tube which is then used for feeding the bullets in a loading machine. Springs are provided to sweep badly misaligned or piles of bullets from the receptacles prior to reaching the recesses.

8 Claims, 5 Drawing Figures

U.S. Patent    Jan. 26, 1982    4,312,438
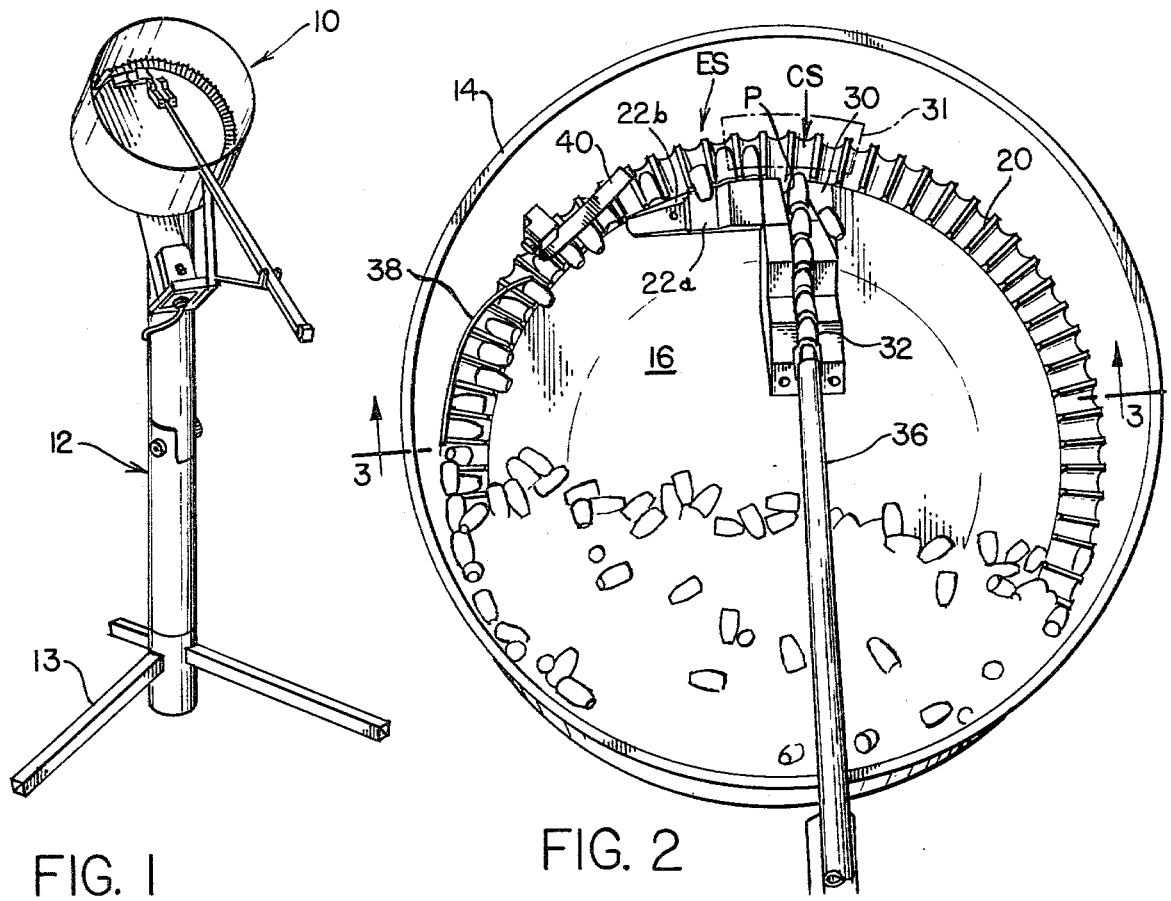
FIG. 1
FIG. 2
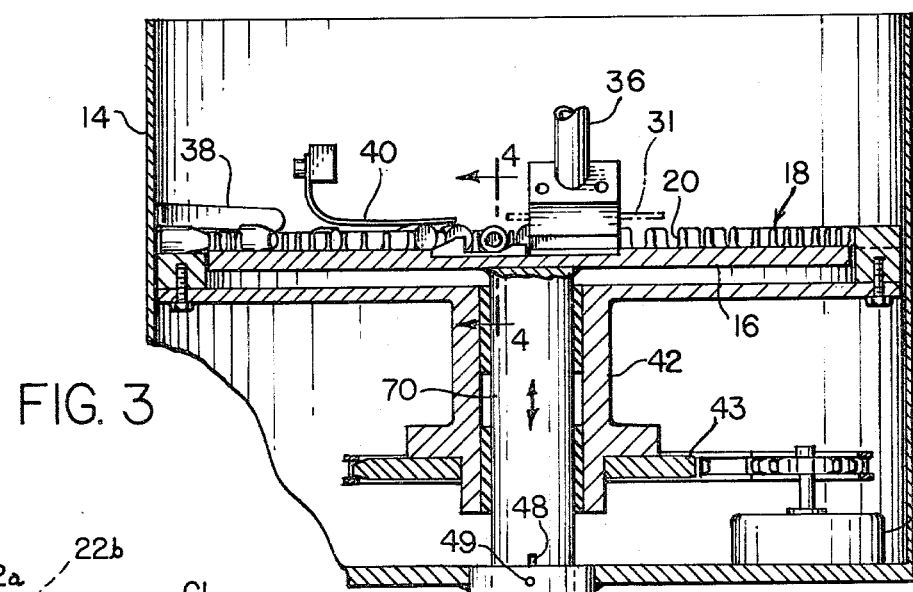
FIG. 3
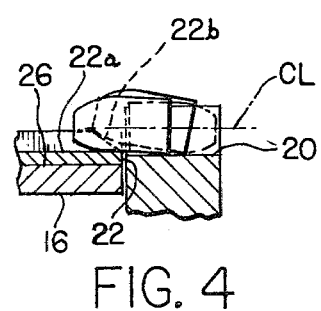
FIG. 4
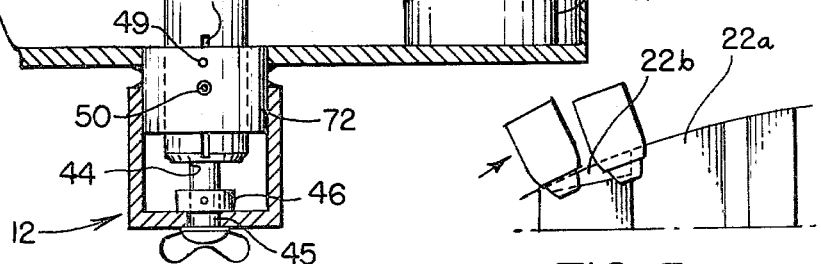
FIG. 5

BULLET ALIGNMENT APPARATUS

This is a continuation of application Ser. No. 890,136, filed Mar. 27, 1978, now abandoned.

BACKGROUND OF THE INVENTION

1. Field of the Invention

This invention pertains to bullet aligning apparatus and, more particularly, to apparatus for aligning conical bullets into a coaxially aligned column.

2. Description of the Prior Art

Bullets are generally cast in large numbers in a machine and then placed in tubes for automatic feeding into a sizing or loading device. Heretofore, there has not been a satisfactory commercial machine to orient or align the bullets automatically for feeding to the sizing or loading device.

SUMMARY OF THE INVENTION

It is an object of this invention to provide an inexpensive and rapid bullet aligning and collecting device.

It is another object of this invention to provide a bullet aligning device suitable for use with varying caliber bullets.

It is another object of this invention to align bullets having different nose end configurations such as smoothed conical ends of jacketed bullets, or stepped ends as button-nose wad-cutter bullets or cast bullets.

Basically these objects are obtained by gathering a plurality of bullets from a supply pile in random fashion into a plurality of receptacles and moving these receptacles past a gauging surface along a sorting path. The bullets of the type being considered are bullets having a conical nose and cylindrical end. Those bullets which lie in the receptacles with the conical nose facing the gauging surface are removed at a first location along the gauging surface which is either raised to lift the bullet over the gauging surface, depressed relative to the center line of the receptacle and the bullet in the receptacle to drop the bullet axially out of the receptacle or both. In the preferred embodiment the receptacle engaging surfaces are inclined so that gravity provides the force to move the bullets from the receptacles. Subsequently, movement of the receptacles with the remaining bullets being positioned with the cylinder end facing the gauging surface are removed at a second depression which is provided with a surface lower than the receptacle by gravity sliding the bullets from the receptacles into a column with all bullets coaxially aligned and facing in the same direction. Means are provided for sweeping the badly misaligned bullets or any accumulated piles of bullets captured in the receptacles free from the receptacles prior to reaching the depressions. The gauging surface is adjustable for accommodating various caliber or diameters of bullets. Preferably, the bullets properly aligned are collected in a hollow tube which can then be transported to a subsequent sizing or loading machine.

The aligning device can be floor mounted or placed on a table. It is very inexpensive to manufacture and yet is capable of handling a large number of bullets. The bullets collected in the tubes are thus available in a form for storage or removal that enables their immediate use into a sizing or loading machine.

BRIEF DESCRIPTION OF THE FIGURES OF THE DRAWINGS

FIG. 1 is an isometric of a bullet aligning device embodying the principles of the invention.

FIG. 2 is a fragmentary plan view of the apparatus shown in FIG. 1.

FIG. 3 is a diametrical section taken along the line 3—3 of FIG. 2.

FIG. 4 is a fragmentary section taken along the line 4—4 of FIG. 3.

FIG. 5 is a schematic fragmentary plan illustrating movement of the bullets above a gauging surface.

DETAILED DESCRIPTION OF THE PREFERRED EMBODIMENTS

As best shown in FIG. 1 the aligning device 10 is suitably mounted on a base 12 supported by legs 13. The aligning device includes a containment wall 14, a rigid stationary plate 16 and a movable ring 18 having a plurality of receptacles 20.

The ring 18 revolves or is movable along a path P relative to the disc or plate 16. The disc and ring are on an angle as shown in FIG. 1 with the upper surface of the disc having a smooth edge or gauging surface 22 exposed to the path P. The base 12 can be pivoted to change the angle of inclination as desired. The gauging surface is above the lower surface of the receptacles 20 so that the nose end or the cylindrical end of the bullet catches on the surface and is held against sliding from the receptacles. At an ejection or separation station ES the plate is provided with a depression 26 having an upper surface 22a that is lower than the center line CL of the center axis of the bullet. The surface 22a, however, is still slightly above the lower surface of the receptacles 20. Thus at the ejection station the conical nose of the bullet if facing the depression 26 will not be held in the receptacle and with the smooth surface of its conical end not providing any holding edges will slide from the receptacle back into the pile of bullets at the bottom of the disc. The bullet with its cylindrical end facing the depression 27, however, will still catch the edge of the surface 22a and continue to move with the receptacles past the disc. At the collecting station CS a second depression 30 is provided with a lower surface lower than the surface of the receptacle 20 so that all bullets remaining in the receptacle will slide from the receptacles into a column 32. The only bullets, of course, remaining in the receptacles at this time will be bullets with the cylindrical ends facing the disc 16. At the collecting station CS a removable hollow tube 36 is releasably fastened for collecting the bullets for storage or delivery to a subsequent sizing or loading operation.

Also provided at the separation station ES is a cam plate having a chamber 22b that raises the protruding nose of a bullet. This facilitates separation of jacketed bullets as shown in FIG. 4 but also lifts the edge a ring of case bullets above the gauging surface as shown in FIG. 5.

Bullets which are standing upright either on their nose end or cylindrical end as they leave the pile of bullets at the lower end of the disc are knocked over into the receptacles or knocked from the receptacles by a spring 38 which is positioned close to the upper surface of the receptacles and overlies the receptacles along substantially the entire transverse width. A second spring 40 will press the ends down on any remaining bullets which are not coaxially aligned within the receptacles into coaxial alignment such that all bullets moving past the second spring 40 will lie within the receptacles in coaxial alignment therewith and facing with their nose end either toward or away from the gauging surface 22. This assures that the nose end of the bullet is not tipped down allowing the removal of the bullets as will be described. An optional plate 31 can be added at the collection station CS to prevent the bullets from toppling end-for-end as they leave the receptacles.

The ring is rotated by a motor 41 which is connected to a shaft 42 through a drive train 43. The machine is adapted also for handling bullets of various shapes and particularly diameters or caliber through an adjustment mechanism which enables the height of the gauging surface 22a to be varied relative to the bottom surface of the receptacles 20. This adjustment is provided by mounting the plate 16 on a shaft 70 that is slidably carried in a bracket 72 fixed to the base 12. The shaft has a threaded axial bore 44 in which is threadably mounted a bolt 45. A washer 46 is held by a set screw rigidly to the bolt to keep the bolt from moving downward but allowing rotation of the bolt. The shaft is provided with a keyway 48 which meshes with a key 49 in the bracket 72. Thus as the bolt 45 is rotated the shaft will be able to move up and down but cannot rotate so that its alignment of depressions relative to the ejecting station and collecting station will be maintained. A set screw 50 locks the shaft in an adjusted position.

A collecting plate 60 is used to guide the bullets into tube 36. The plate can be substituted with one having a conical chute for guiding smaller diameter bullets into the tube.

While the preferred embodiments of the invention have been illustrated and described, it should be understood that variations will be apparent to one skilled in the art without departing from the principles herein. Accordingly, the invention is not to be limited to the specific embodiment illustrated in the drawing.

I claim:

1. Apparatus for aligning bullets of the type having a conical nose and a cylindrical end into a column all pointing the same direction and with the longitudinal axes of all bullets commonly aligned, comprising:

a fixed plate having means defining a gauging surface;

a movable member having a plurality of bullet carrying receptacles;

containment means surrounding said plate and member for holding a supply of bullets in the path of said receptacles;

means for guiding the movable member past said gauging surface with the receptacles closey adjacent the gauging surface;

said plate and receptacles having a downward inclination along the lengthwise axis of the receptacles so that bullets lying in the receptacles will slide by gravity toward the gauging surface;

means for raising the conical nose of a bullet having its conical nose facing the gauging surface above said gauging surface for allowing the bullet to slide by gravity past the gauging surface;

a separation depression in said gauging surface having a lower surface below the longitudinal axis of the bullet but above the lower cylindrical end of the bullet and located just after said conical nose raising means in the direction of member movement so that a conical nose of a bullet facing the depression will slide past the gauging surface out of the receptacle but a cylindrical end facing the depression will abut against the lower surface of the depression and continue to be held in the receptacle;

a collection depression in said gauging surface after the conical nose raising means and separation depression in the direction of member movement and having a lower surface below the cylindrical end of the bullet so that bullets having their cylindrical ends facing the collection depression will drop through the collection depression;

means for collecting the bullets dropping through the collection depression in a single column with their longitudinal axes commonly aligned; and means for moving the receptacles successively past the conical nose raising means, separation depression and collection depression to separate nose-down bullets from nose-up bullets and collect the nose-up bullets in a single column in said collecting means.

2. The apparatus of claim 1, including means prior to the separation depression in the direction of receptacle movement for deflecting upright or stacked bullets out of said receptacles.

3. The apparatus of claim 1, including means prior to the separation depression for pushing the bullets into coaxial alignment with the receptacles.

4. The apparatus of claim 1, said collecting means including a removable tube for carrying and storing the collected bullets.

5. The apparatus of claim 1, including means for providing relative vertical height adjustment between the depressions and receptacles for aligning other sized diameter bullets.

6. The apparatus of claim 1, including a leaf spring curved inwardly from said containment means over said receptacles for sweeping bullets protruding upwardly out of said receptacles away from said receptacles, a leaf member overlying the receptacles and having a flat surface confronting the receptacles for pushing misaligned bullets into coaxial alignment within the receptacles, said collecting means including a removable tube for storing and carrying the collected bullets, and means for varying the height position of the lower surface of the separation depression relative to the receptacles for sorting out bullets of different diameters.

7. The apparatus of claim 6, said plate being fixed on shaft, said shaft being adjustably positioned on a stationary frame, said frame having a base and legs supporting said base on the floor.

8. The apparatus of claim 6, said movable member including a ring surrounding said plate, said means for moving the receptacles including a drive train coupled between the ring and a drive motor.

* * * * *